United States Patent
Zeng et al.

(10) Patent No.: US 10,819,446 B2
(45) Date of Patent: Oct. 27, 2020

(54) RADAR TRANSMITTING POWER AND CHANNEL PERFORMANCE MONITORING APPARATUS

(71) Applicants: Institute of Geology and Geophysics, Chinese Academy of Sciences, Beijing (CN); The 14th Research Institute of China Electronic Technology Group Corporation, Jiangsu (CN)

(72) Inventors: Lingqi Zeng, Beijing (CN); Baiqi Ning, Beijing (CN); Weixing Wan, Beijing (CN); Lin Jin, Jiangsu (CN); Biqiang Zhao, Beijing (CN); Feng Ding, Beijing (CN); Changhai Ke, Jiangsu (CN); Yunxia Zhang, Jiangsu (CN)

(73) Assignees: Institute of Geology and Geophysics, Chinese Academy of Sciences, Beijing (CN); The 14th Research Institute of China Electronic Technology Group Corporation, Nanjing (CN)

(*) Notice: Subject to any disclaimer, the term of this patent is extended or adjusted under 35 U.S.C. 154(b) by 0 days.

(21) Appl. No.: 16/396,589

(22) Filed: Apr. 26, 2019

(65) Prior Publication Data
US 2019/0334634 A1 Oct. 31, 2019

(30) Foreign Application Priority Data

Apr. 26, 2018 (CN) .......................... 2018 1 0390362

(51) Int. Cl.
*H04B 17/10* (2015.01)
*G01S 7/40* (2006.01)
*H04B 17/318* (2015.01)

(52) U.S. Cl.
CPC ......... *H04B 17/102* (2015.01); *H04B 17/104* (2015.01); *H04B 17/318* (2015.01)

(58) Field of Classification Search
CPC ...... H04B 17/00; H04B 17/10; H04B 17/102; H04B 17/104; H04B 17/318; H04B 1/18;
(Continued)

(56) References Cited

U.S. PATENT DOCUMENTS 5,333,000 A * 7/1994 Hietala ..................... G02F 2/02
342/368
5,493,304 A * 2/1996 Lee ........................ G01S 7/4052
342/173

(Continued)

*Primary Examiner* — Haissa Philogene
(74) *Attorney, Agent, or Firm* — Greenberg Traurig, LLP

(57) ABSTRACT

According to aspects of the present disclosure, a radar transmitting power and channel performance monitoring apparatus is disclosed. In one example, such apparatus may include a plurality of couplers, power combiners of multiple stages, and a power monitoring module, wherein the couplers are connected with transmitter/receiver modules of the radar, and each coupler may be configured to collect a transmitting power of a corresponding transmitter/receiver module. Further, the power combiners may be configured to combine the transmitting power collected by each coupler and input the resultant total power to the power monitoring module, and the power monitoring module may be configured to monitor the total power. In addition, aspects of the present disclosure may test an amplitude and phase consistency of the transmitting and receiving channels of each T/R module of radar to ensure the performance of the radar system.

20 Claims, 4 Drawing Sheets

(58) Field of Classification Search
CPC ........ G01S 7/40; G01S 7/4026; G01S 7/2813; G01S 7/282; G01S 7/285; G01S 7/032; G01S 13/4463; G01S 2007/4091; H01Q 3/2676; H01Q 25/00; H01Q 21/0025; Y02A 90/18
See application file for complete search history.

(56) References Cited

U.S. PATENT DOCUMENTS

| | | | | |
|---|---|---|---|---|
| 6,784,837 | B2* | 8/2004 | Revankar | G01S 7/032 |
| | | | | 342/157 |
| 8,106,825 | B1* | 1/2012 | Wangsness | H01Q 25/00 |
| | | | | 342/368 |
| 9,478,858 | B1* | 10/2016 | West | G01S 13/953 |
| 9,791,552 | B1* | 10/2017 | Schuman | G01S 7/40 |

* cited by examiner

RADAR TRANSMITTING POWER AND CHANNEL PERFORMANCE MONITORING APPARATUS

CROSS-REFERENCE TO RELATED APPLICATIONS

This application is a Paris Convention filing and claims benefit/priority of Chinese patent application No. 2018103903624, filed Apr. 26, 2018, published as, and entitled "Radar Transmitting Power Monitoring Apparatus", which are incorporated herein by reference in entirety.

TECHNICAL FIELD

The present disclosure relates to the field of radars, and particularly to a radar transmitting power and channel performance monitoring apparatus.

BACKGROUND ART

Radar is an electronic device that detects a target using electromagnetic waves, and the magnitude of the transmitting power of a radar is an essential condition for accurate measurement of some important parameters of the target. A phased array radar employs a distributed transmitting system, and the total transmitting power of the entire radar system is the sum of the power of all the transmitters. The transmitter/receiver modules of an active phased array radar are T/R (Transmitter/Receiver) modules, and the array of a large phased array radar is composed of thousands of T/R modules; and under the coordination of a radar control unit, each T/R module transmits and receives signals independently. Normally, the energy transmitted by each T/R module is substantially the same. However, in practical situations, due to influence of various factors, when radar is in operation for a long period of time, the transmitting power of each T/R module varies greatly, and in severe cases, some modules may fail.

For the existing radar monitoring technique, the transmitting power of each T/R module of the phased array radar is monitored, thereby monitoring the transmitting power of the entire radar system. However, this technique is too costly and requires a large number of devices, and the reliability is difficult to be guaranteed.

Overview of Certain Aspects

In a first aspect, an embodiment of the present disclosure provides a radar transmitting power and channel performance monitoring apparatus, comprising a plurality of couplers, power combiners of multiple stages and a power monitoring module, wherein the couplers are connected with transmitter/receiver modules of the radar respectively, each coupler is configured to collect a transmitting power of a corresponding transmitter/receiver module, each power combiner is configured to combine the transmitting power collected by respective coupler(s) and input a resultant total power to the power monitoring module, and the power monitoring module is configured to monitor the total power.

In a second aspect, an embodiment of the present disclosure further provides a radar system, comprising the above-described radar transmitting power and channel performance monitoring apparatus, and further comprising transmitter/receiver modules.

In connection with the second aspect, an embodiment of the present disclosure provides a first possible implementation mode of the second aspect, in which the above-described system further comprises a radar control unit, wherein the radar control unit is connected with the transmitter/receiver modules, and the radar control unit is further connected with the power monitoring module of the radar transmitting power and channel performance monitoring apparatus.

Embodiments of the present disclosure provide a radar transmitting power and channel performance monitoring apparatus, wherein the transmitting power of each transmitter/receiver module is collected by a corresponding coupler; the transmitting power collected by each coupler is combined by power combiners, and a resultant total power is input to a power monitoring module; and the total power is monitored by the power monitoring module. With this method, the complexity of the power and channel performance monitoring apparatus is reduced, the reliability of the system is improved, and at the same time the cost of the power and channel performance monitoring apparatus is reduced.

Other features and advantages of the present disclosure will be set forth in the following description, or some of the features and advantages may be inferred or unambiguously determined from the description, or may be learned by implementing the above-described techniques of the present disclosure.

In order to make it easier to understand various objectives, features and advantages of the present disclosure, detailed description is made below in connection with preferred embodiments with reference to the accompanying drawings.

BRIEF DESCRIPTION OF DRAWINGS

In order to more clearly illustrate the technical solutions of the embodiments of the present disclosure or in the prior art, brief description is made below on the drawings required to be used in the description of the embodiments or the prior art. It is apparent that the drawings described below only illustrate some of the embodiments of the present disclosure, and for a person of ordinary skills in the art, other drawings may be obtained from these drawings without inventive effort.

DETAILED DESCRIPTION OF ILLUSTRATIVE IMPLEMENTATIONS

Figure 1:
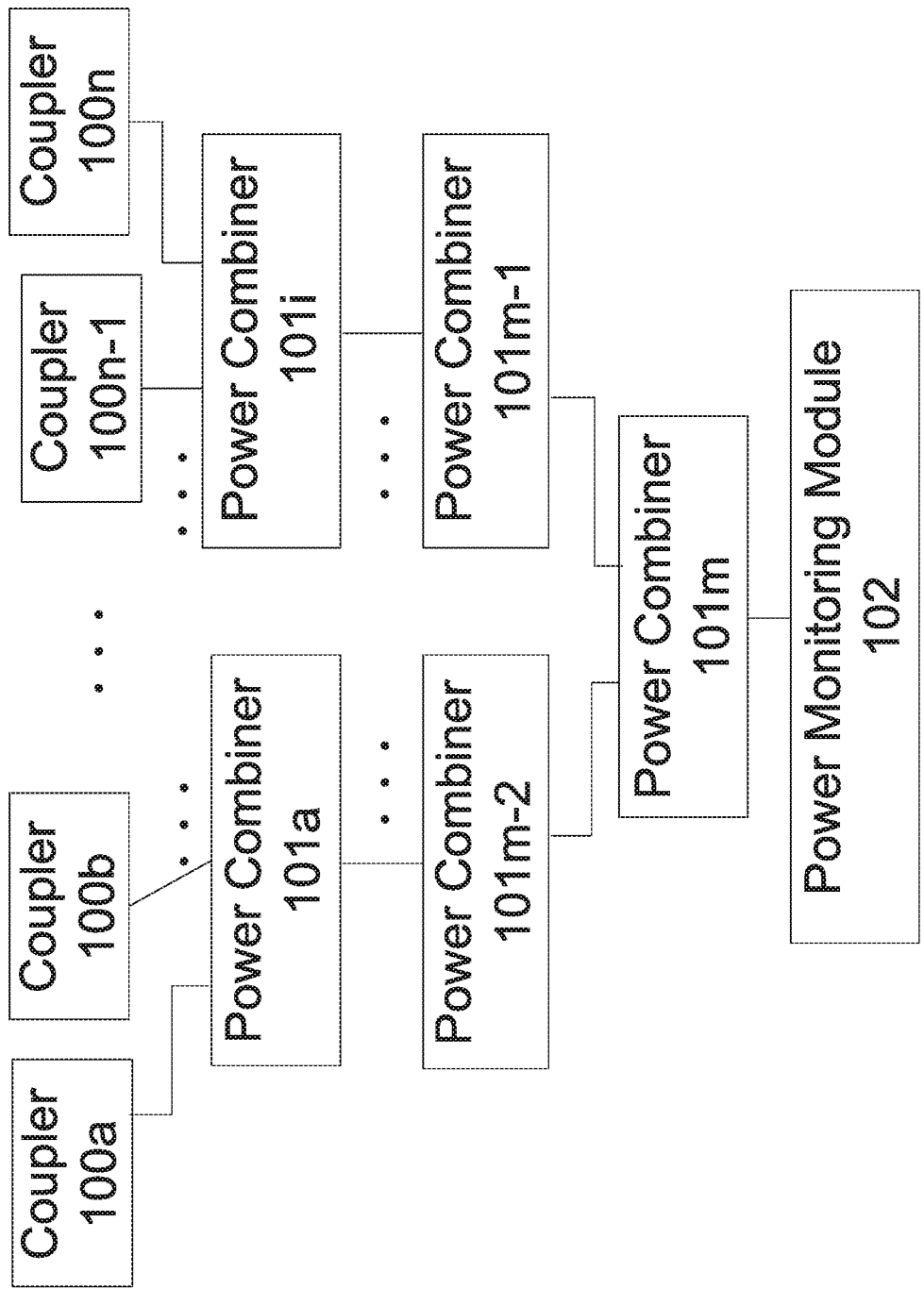
FIG. 1 is a structural schematic diagram of a radar transmitting power and channel performance monitoring apparatus according to the present disclosure.

In order to make the objectives, technical solutions and advantages of the embodiments of the present disclosure clearer, the technical solutions of the present disclosure will be described clearly and completely below with reference to the drawings. Apparently, the embodiments described are some of the embodiments of the present disclosure, rather than all of the embodiments. All the other embodiments that are obtained by a person of ordinary skills in the art without inventive effort on the basis of the embodiments of the present disclosure shall be covered by the protection scope of the present disclosure.

Incoherent scatter radar is an ideal tool for studying the energy and mass transport of the atmosphere-ionosphere-magnetosphere system and the interaction effect of solar wind-magnetosphere. Ionospheric multi-parameter information is acquired by transmitting high-power electromagnetic waves and receiving the weak Thomson scattering signals of the electrons in the ionosphere. Incoherent scattering sounding (detection) can directly detect, with high accuracy, the electron density, temperature, composition and drift velocity (electric field) of the plasma at almost the entire ionospheric height, and can also indirectly detect the temperature and the wind field of the background neutral atmosphere, and heterogeneous bodies of the inner magnetosphere. Detection by incoherent scatter radar has prominent advantages, such as having numerous measurement parameters and having wide detection airspace, and is the most powerful means to detect the ionosphere from the ground.

One of the important functions of incoherent scatter radar is to measure the spatial and temporal variations of electron density in the ionosphere. The method is to measure the magnitude of the scatter echo power of the electrons and then back-calculate the electron density. According to the radar equation, the magnitude of the echo power is not only related to the electron density, but also related to the parameters of the radar itself, among which the radar transmitting power is an important parameter. In order to accurately measure the height and temporal variations of the electron density and remove the influence of the transmitting power on the measurement results, it is necessary to monitor the transmitting power of the incoherent scatter radar in real time.

From the perspective of transmitting power, radars can be divided into radars with centralized transmitting mechanisms and radars with distributed transmitting mechanisms. The transmitting power of a radar with a centralized transmitting mechanism is generated and amplified by a certain transmitting apparatus, and then conveyed to a radar antenna. The traditional incoherent scatter radars mostly have a centralized transmitting mechanism, and the monitoring of the transmitting power thereof is relatively simple. The transmitting power of a radar with a distributed transmitting system is simultaneously generated and amplified by multiple transmitting apparatuses, and is transmitted to a radar antenna in parallel, and the total power of the radar is obtained by combination in space by antenna radiation. The most common radar with the distributed transmitting mechanism is radar having an active phased array mechanism, which has developed rapidly in recent years. The active phased array radar has a large number of amplifiers for power generation, and the transmitting power monitoring of an active phased array radar is relatively complicated.

The active phased array radar employs a distributed transmitting system, the T/R modules (Transmitter and Receiver Modules) are essential transmitter/receiver modules of the active phased array radar, and the total transmitting power of the radar is the sum of the power of each the transmitter/receiver module. The array of a large active phased array radar is composed of thousands of T/R modules, wherein each T/R module can transmit and receive electromagnetic wave signals independently. Normally, the energy transmitted by each T/R module is the same. However, in practical operation, especially when radar is in operation for a long period of time, the transmitting power of each T/R module may decrease, and some modules may even fail.

In order to monitor the magnitude of the transmitting power of radar, the method adopted in the prior art is to monitor the transmitting power of each T/R module of the phased array radar, thereby monitoring the total transmitting power of the radar. The existing advanced modular incoherent scattering radar (AMISR) is mainly used for measuring the plasma parameters of the ionosphere in the upper space of the earth. In order to accurately back-calculate the plasma parameters, it is necessary to measure the transmitting power of the radar and record the magnitude of the transmitting power in real time.

The method adopted for AMISR is to independently monitor the power of each module, and calculate the total power by summing the power monitoring value of each module. The advantage of the AMISR is enabling simultaneous monitoring of the power of each single T/R module. However, equipping each T/R module with a power detection sensor will lead to a large number of sensor devices and high cost, and the possibility of sensor failure is accordingly high; and the power monitoring module installed in each module is an active element, the power monitoring module shares one circuit board with the respective transmitter/receiver module, and the heat consumption in the modules in an enclosed space increases, which is not conducive to the heat dissipation of the T/R modules.

Based on this, an embodiment of the present disclosure provides a radar transmitting power and channel performance monitoring apparatus, which is applicable monitoring power of radar and other distributed electronic devices.

In order to facilitate understanding of the present embodiment, a radar transmitting power and channel performance monitoring apparatus disclosed in an embodiment of the present disclosure is first described in detail.

Referring to the structural schematic diagram of a radar transmitting power and channel performance monitoring apparatus shown in FIG. 1, the apparatus comprises a plurality of couplers (100a, 100b, 100n), power combiners of multiple stages (101a, 101b, . . . , 101i, . . . , 101m), and a power monitoring module 102.

The plurality of couplers (100a, 100b, 100n) are connected with a plurality of transmitter/receiver modules of the radar, respectively, and the couplers are configured to collect the transmitting power of the corresponding transmitter/receiver modules.

Specifically, each coupler is a radio frequency element that extracts a small part of signals from a main wireless signal channel. The degree of coupling is an important indicator of the coupler, which is the ratio of the power of the coupling port to the power of the input port, and is generally negative when represented by dB. Couplers having corresponding coupling degrees are selected according to the design requirement. The transmitter/receiver modules are essential components of the phased array radar, and are configured to amplify, filter, and phase-shift the transmitted and received signals. The coupler may be disposed at the antenna end of the respective transmitter/receiver module, and the coupler may couple a part of the radio frequency power of signals into a coupling circuit according to a certain ratio (degree of coupling), with the signals transmitted from the transmitter/receiver module.

The above-described power combiners (101a, 101b, . . . , 101i, . . . , 101m) are configured to combine the transmitting power collected by respective couplers and input the resultant total power to the power monitoring module.

Specifically, in the present embodiment, a power divider may be used in reverse as a power combiner. The power divider is an element that divides the energy of one input signal into two or more outputs of equal or unequal energy, and the power divider may also in turn combine the energy of multiple signals into one output, and in such a case, may also be referred to as a combiner, i.e., the above-described power combiner.

The input power of each coupler is in fixed proportion (typically 30 dB, i.e., the input power of the coupler is approximately 1/1000 of the output power of the transmitter/receiver module) to the actual output power of the corresponding transmitter/receiver module, therefore, the output power of the corresponding transmitter/receiver module can be obtained simply by measuring the input power of the coupler.

Assuming that the input power signal of the $i^{th}$ coupler is:

$$a_i e^{j\varphi_i + j\omega t}$$

wherein $a_i$ is amplitude, and is a value to be measured, which value determines the magnitude of the transmitting power of the transmitter/receiver module, $\varphi_i$ is an initial phase of each transmitting channel, and $\omega$ is a carrier frequency, which is the same for all coupling channels.

The signals of the couplers are combined into one signal $Ae^{j\varphi + j\omega t}$ via an isometric network, which is expressed as follows:

$$Ae^{j\varphi + j\omega t} = \sum_{1}^{N} a_i e^{j\varphi_i + j\omega t} = e^{j\omega t}\sum_{1}^{N} a_i e^{j\varphi_i}$$

The initial phase $\varphi_i$ of each transmitting channel may be controlled by an in-channel phase shifter, and when the channels have the same phase shifting amount, there is established:

$$Ae^{j\varphi + j\omega t} = e^{j\omega t}e^{j\varphi_o} \sum_{1}^{N} a_i$$

Therefore, what is obtained from measurement is the sum of the power of the transmitting channels of the transmitter/receiver modules.

When the channels have different phase shifting amounts, this time the power obtained from measurement by the radar transmitting power and channel performance monitoring apparatus is equivalent to the radiation power of an equivalent side lobe of the array, the power difference of the equivalent side lobe with respect to the main lobe can also be calculated according to the phase shifting amount, and in this way, the actual radiation power of radar is obtained. The power measured after a phase-shifting is smaller than the actual radiation power of the main lobe, and the value of the above-described power difference may be calculated with the help of a radar directional pattern, wherein the radar directional pattern of a phased array radar may be pre-acquired when the orientation of the array of the phased array radar is already fixed.

The above-described power monitoring module 102 is configured to monitor the total power. Specifically, the power monitoring module may measure the received power in real time, determine whether the power of radar is within the normal operating power range, and send the determination result to a radar controller.

The embodiment of the present disclosure provides a radar transmitting power and channel performance monitoring apparatus, wherein the transmitting power of each transmitter/receiver module is collected by a corresponding coupler; the transmitting power collected by each coupler are combined by power combiners, and the resultant total power is input to a power monitoring module; and the total power is monitored by the power monitoring module. With this mode, the complexity of the power and channel performance monitoring apparatus is reduced, the reliability of the system is improved, and at the same time the cost of the power and channel performance monitoring apparatus is reduced.

An embodiment of the present disclosure further provides another radar transmitting power and channel performance monitoring apparatus that is realized on the basis of the apparatus shown in FIG. 1. The apparatus comprises a plurality of couplers, power combiners of multiple stages, a power monitoring module, a radio frequency cable and an attenuator. The couplers are disposed at the antenna end of the respective transmitter/receiver modules, and are configured to collect the transmitting power of the respective transmitter/receiver modules according to a preset coupling ratio. Optionally, the couplers may be passive couplers.

The plurality of power combiners are configured to combine the radio frequency signals collected by the plurality of couplers into one signal and input the one signal to the power monitoring module, without changing the magnitude of the total power. Among the power combiners of multiple stages, each of power combiners of the first stage is connected with multiple different couplers; among the power combiners of other stages except the first stage, each power combiner is connected with multiple power combiners of an upper stage; among the power combiners of other stages except the last stage, each power coupler is merely connected with one power combiner of a lower stage; and the power combiner of the last stage is connected with the power monitoring module.

Optionally, in the present embodiment, each of the power combiners of the first stage is connected with the same number of couplers; and among the power combiners of other stages except the first stage, each of the power combiners of the same stage is connected with the same number of power combiners of an upper stage.

Figure 2:
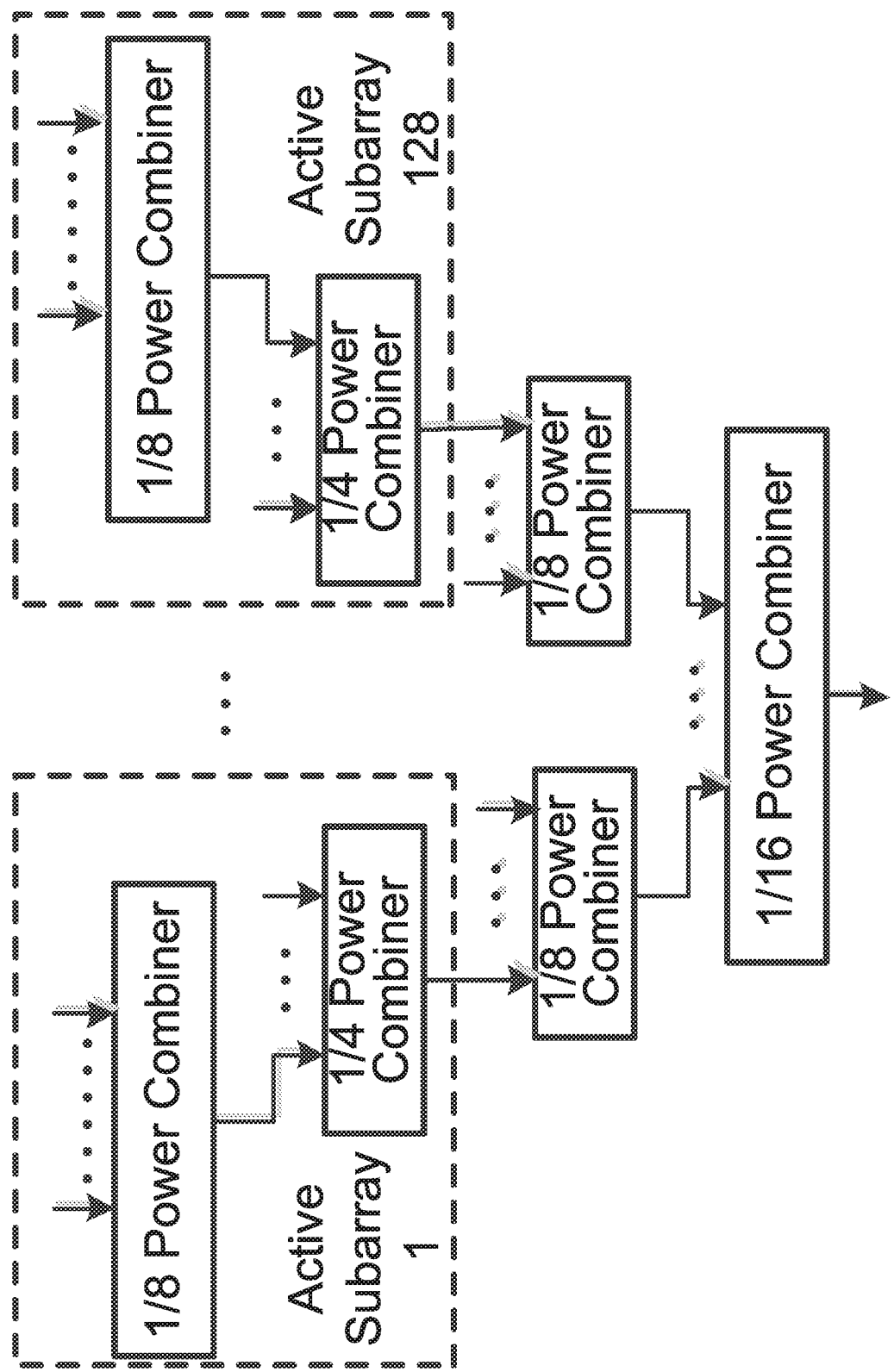
FIG. 2 is a schematic diagram of a monitoring network structure composed of power combiners of 4 stages according to the present disclosure.

Referring to the schematic diagram of a monitoring network structure composed of power combiners of 4 stages shown in FIG. 2, the monitoring network structure is applicable to a phased array radar comprising 4096 transmitter/receiver modules, wherein every 32 transmitter/receiver modules are referred to as an active subarray. The monitoring network is constituted by 512⅛ power combiners, 128¼ power combiners, 16⅛ power combiners and 1 1/16 power combiner in this order.

The radio frequency cable is configured to realize the connection between the couplers and the power combiners and the connection between the power combiners. The connection between the couplers and the power combiners and the connection between the power combiners of different stages are both realized by equal-length radio frequency cables, such mode can ensure synchronization of the power combination of the transmitter/receiver modules.

The attenuator is disposed between the power combiner of the last stage and the power monitoring module, and is configured to adjust, according to the input power range of the power monitoring module, the output total power obtained after the processing by the power combiners. In other words, the attenuator is used for adjusting the total power output from the power combiner of the last stage to within the rated input power range of the power monitoring module.

Further, the above-described apparatus further comprises a switch component, wherein the component is disposed between the power combiner of the last stage and the power monitoring module.

The power monitoring module receives the total radar power that has passed through the attenuator.

Further, the power monitoring module is further configured to: detect whether the total radar power is within a preset normal power range, wherein the normal power range is set according to the rated power of the transmitter/receiver modules; and generate and emit an alarm signal if the total radar power of the power monitoring modules is not within the preset normal power range.

In the above-described radar transmitting power and channel performance monitoring apparatus, the mode of independently monitoring the transmitting power of each module is employed, a small part of the transmitting power is coupled into the monitoring network at the antenna end of each module by means of passive coupling, and the monitoring network collects and combines the transmitting power from these modules and then inputs the same to the power monitoring module for total power monitoring. Since the number of active devices in the apparatus is relatively small, the possibility of failure and damage is reduced, the heat consumption is reduced, the stability of the system is greatly improved, and the cost is relatively low.

Figure 3:
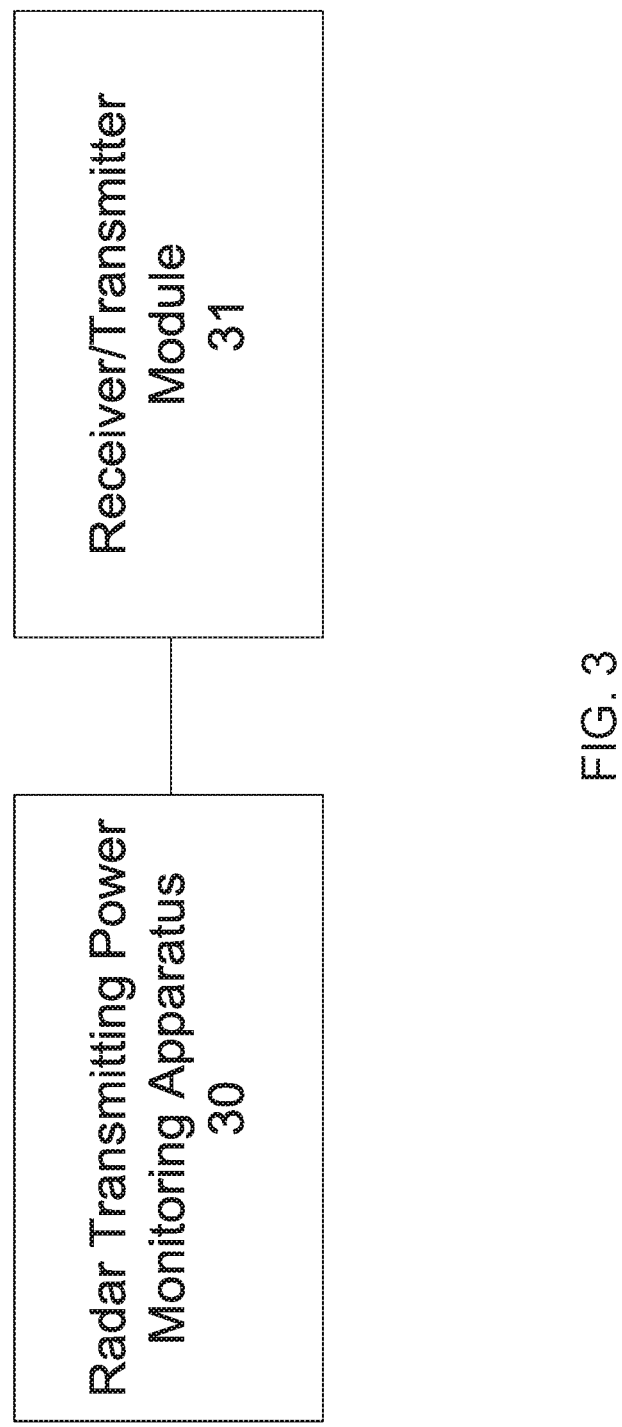
FIG. 3 is a structural schematic diagram of a radar system according to the present disclosure.

An embodiment of the present disclosure further provides a radar system, and the structural schematic diagram of the radar system is shown in FIG. 3. The system comprises the above-described radar transmitting power and channel performance monitoring apparatus 30, and further comprises transmitter/receiver modules 31. The transmitter/receiver modules, also known as T/R modules, are essential components of the phased array radar, which accomplish the amplification, filtering, phase-shifting, etc. of the transmitted and received signals. Each T/R module usually comprises a transmitting channel and a receiving channel, and a unit circuit should comprise: a local oscillator, an up-down frequency converter, a filter, a low noise amplifier, a power amplifier, a duplex circuit, etc.

Further, the above-described system further comprises a radar control unit, wherein the radar control unit is connected with the transmitter/receiver modules, and the radar control unit is further connected with the power monitoring module of the radar transmitting power and channel performance monitoring apparatus.

Figure 4:
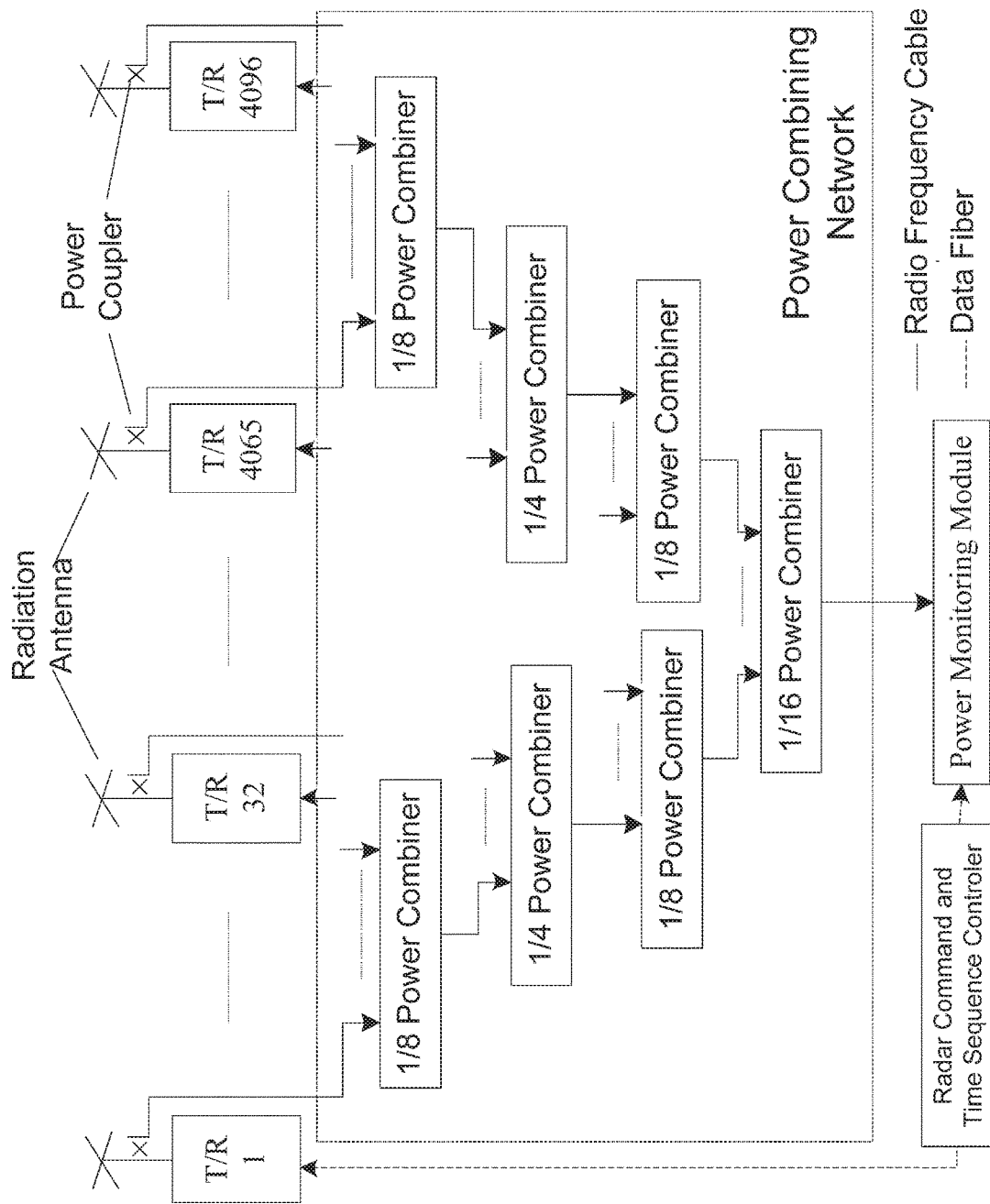
FIG. 4 is an operation schematic diagram of radar transmitting power monitoring according to the present disclosure.

Referring to the operation schematic diagram of radar transmitting power monitoring shown in FIG. 4, the operation process of another radar system based on the above-described system is shown in FIG. 4. The system comprises radiation antennas, transmitter/receiver modules (T/R modules), a main monitoring network, bidirectional couplers, a power monitoring module, and a radar command and time sequence controller (i.e., the radar controller described above). In the system, 4096 T/R modules are comprised in total, wherein each T/R module is connected with the respective radiation antenna, a bidirectional power coupler is connected with the end of the module, and every 32 T/R modules form an active subarray, forming totally 128 active subarrays. The monitoring network is constituted by 512⅛ power combiners, 128¼ power combiners, 16⅛ power combiners and 1 1/16 power combiner in this order. Each of the power combiners (512⅛ power combiners) of the first-stage are connected with the respective transmitter/receiver module through a coupler; the power combiners and the couplers are connected by radio frequency cables; the transmitting power of each module is coupled into the monitoring network at a fixed ratio (which is 1/1000 in this embodiment); and the monitoring network combines the coupled energy of the transmitter/receiver modules of the entire radar array, and finally the resultant energy from the modules of the whole array is monitored and recorded by a power sensor. The radar command and time sequence controller sends commands to and receives data from the power monitoring module and the T/R modules via data (optical) fibers.

In addition, for the phased array radar system, the consistency of the amplitude and phase of the transmitting and receiving channels of the T/R modules has an important effect on the performance of the whole radar system, which needs to be tested at intervals. The power monitoring module has the function of transmitting and receiving electromagnetic wave signals. At the time of transmitting electromagnetic wave pulse signals, the signal power and phase stability are high, and at the time of receiving electromagnetic wave signals, the power monitoring module can acquire the amplitude and phase values of the signals simultaneously, and can also acquire the magnitude of the signal power.

In testing the amplitudes and phases of transmitting channels of the T/R modules, the power monitoring module is configured to receive a first electromagnetic wave signal transmitted by a transmitter/receiver module and obtain the amplitude and the phase of the first electromagnetic wave signal, and the amplitude and the phase of the first electromagnetic wave signal received by the power monitoring module are compared with the amplitude and the phase of the electromagnetic wave signal input to the transmitter/receiver module to acquire an amplitude difference (or ratio) and a phase difference between the above two signals, so as to obtain a transmitting channel performance of the T/R module based on the amplitude difference and the phase difference.

Specifically, the radar control unit may further be configured to control, at the time of testing the amplitude/phase consistency of the transmitting channel of a target transmitter/receiver module, the transmitter/receiver modules other than the target transmitter/receiver module to be in the off state, and control the target transmitter/receiver module to be in the transmitting state, so that the radar transmitting power and channel performance monitoring apparatus obtains the amplitude and phase values of transmitting signal of the target transmitter/receiver module.

For example, at the time of testing the amplitude/phase consistency of the transmitting channel of the $N^{th}$ T/R module, under the coordination of the radar command and time sequence controller, the other T/R modules are in the off state and only the $N^{th}$ T/R module is in the transmitting state, and the power monitoring module obtains the amplitude and phase values of the transmitting signal of the $N^{th}$ module.

In testing the amplitudes and phases of receiving channels of the T/R modules, the power monitoring module is configured to generate a second electromagnetic wave signal with stable amplitude and phase, and the second electromagnetic wave signal is transmitted to a transmitter/receiver module via the power combiners of multiple stages and the couplers; and the amplitude and the phase of the second electromagnetic wave signal transmitted by the power monitoring module are compared with the amplitude and the phase of the electromagnetic wave signal received by the transmitter/receiver module, to acquire an amplitude difference (or ratio) and a phase difference between the above two signals, so as to obtain a receiving channel performance of the T/R module based on the amplitude difference and the phase difference.

Specifically, the radar control unit may further be configured to control, at the time of testing the amplitude/phase consistency of a receiving channel of a target transmitter/receiver module, the transmitter/receiver modules other than the target transmitter/receiver module to be in the off state, and control the target transmitter/receiver module to be in the receiving state, so that the signals generated by the radar transmitting power and channel performance monitoring apparatus are received by the target transmitter/receiver module.

For example, at the time of testing the amplitude/phase consistency of the receiving channel of the $N^{th}$ T/R module, under the coordination of the radar command and time sequence controller, the other T/R modules are in the off state and only the $N^{th}$ T/R module is in the receiving state, and the power monitoring module generates a transmitting signal having fixed power and phase, the transmitting signal enters the T/R module under test via the couplers and a power dividing network composed of power dividers (reverse application of power combiners) of various stages, then the receiving amplitude and phase values of the T/R module can be obtained.

All the T/R modules in the system are tested as described above, for example, 4096 tests are required for this system, then the amplitude and phase values of the transmitting channels and receiving channels of all the T/R modules can be obtained, and in this way, the condition of amplitude and phase consistency of the T/R modules of the entire array is obtained, which provides the basis for channel compensation, so as to maintain the amplitude and phase consistency of the transmitting channels and receiving channels of the T/R modules.

The radar system provided in embodiments of the present disclosure has the same technical features as the radar transmitting power and channel performance monitoring apparatus provided in the embodiment described above, and therefore can solve the same technical problem and achieve the same technical effects.

The computer program products of the radar transmitting power and channel performance monitoring apparatus and the radar system provided by the embodiments of the present disclosure comprise a computer readable storage medium encoded with program codes that comprise instructions for executing the methods described in the preceding method embodiments. As to the specific implementation, reference can be made to the method embodiments, and no further description will be made here.

It could be clearly understood by a person skilled in the art that for convenience and brevity of description, as to the specific working processes of the system and/or apparatus described above, reference may be made to the corresponding processes in the method embodiments described above, and no further description will be made here.

In addition, in the description of the embodiments of the present disclosure, unless otherwise explicitly specified or defined, the terms "install", "link" and "connect" shall be understood in broad sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skills in the art could understand the specific meaning of the terms in the present disclosure according to specific situations.

When implemented in the form of software functional modules and sold or used as independent products, the functions can be stored in a computer readable storage medium. Based on such understanding, the substance of the technical solution of the present disclosure, the part of the technical solution of the present disclosure that makes contributions to the prior art, or part of the technical solution can be embodied in the form of a software product, and the computer software product is stored in a storage medium, comprising some instructions for enabling one computer device (which can be a personal computer, a server, a network device or the like) to execute all or some of the steps of the methods in the embodiments of the present disclosure. The storage medium includes various mediums capable of storing program codes, such as a USB flash disk, a mobile hard disk, a read-only memory (ROM), a random access memory (RAM), a magnetic disk, or an optical disk.

In the description of the present disclosure, it is to be noted that the orientation or position relation denoted by the terms such as "center", "upper", "lower", "left", "right", "vertical", "horizontal", "inner" and "outer" is based on the orientation or position relation indicated by the figures, which only serves to facilitate describing the present disclosure and simplify the description, rather than indicating or suggesting that the device or element referred to must have a particular orientation, and is constructed and operated in a particular orientation, and therefore cannot be construed as a limitation on the present disclosure. In addition, the terms "first", "second" and "third" are for descriptive purposes only and cannot be understood as an indication or implication of relative importance.

Finally, it should be noted that the above embodiments are only specific implementation modes of the present disclosure and are used to illustrate the technical solutions of the present disclosure, rather than limit the same, and the scope of protection of the present disclosure is not limited thereto; although the present disclosure has been described in detail with reference to the foregoing embodiments, it should be understood by a person of ordinary skills in the art that within the technical scope in the present discourse, a person skilled in the art could still modify the technical solutions described in the embodiments, readily conceive variations thereof, or make equivalent substitution to some of the technical features therein; and the modifications, variations or substitutions would not cause the substance of the corresponding technical solutions to depart from of the spirit and scope of the technical solutions of the embodiments of the present disclosure, and shall all be covered by the scope of protection of the present disclosure. Therefore, the scope of protection of the present disclosure shall be determined by the scope of protection of the appended claims.

INDUSTRIAL APPLICABILITY

Embodiments of the present disclosure provide a radar transmitting power and channel performance monitoring apparatus, wherein the transmitting power of each T/R module is collected by a corresponding coupler; the transmitting power collected by each coupler are combined by power combiners, and the resultant total power is input to a power monitoring module; and the total power is monitored by the power monitoring module. In this way, the complexity of the power and channel performance monitoring apparatus is reduced, the reliability of the system is improved, and at the same time the cost of the power and channel performance monitoring apparatus is reduced.

The invention claimed is:

1. A radar transmitting power and channel performance monitoring apparatus, comprising a plurality of couplers, power combiners of multiple stages and a power monitoring module,
wherein the couplers are respectively connected with transmitter/receiver modules of a radar, each coupler is configured to collect a transmitting power of a corresponding transmitter/receiver module;
each power combiner is configured to combine transmitting power collected by respective coupler(s) and input a resultant total power to the power monitoring module; and
the power monitoring module is configured to monitor the total power.

2. The apparatus according to claim 1, wherein each of the couplers is a passive coupler.

3. The apparatus according to claim 1, wherein each of the couplers is disposed at an antenna end of a respective transmitter/receiver module, and is configured to collect transmitting power of the respective transmitter/receiver module according to a preset coupling ratio.

4. The apparatus according to claim 1, wherein among the power combiners of multiple stages, each power combiner of power combiners of a first stage is connected with multiple different couplers;
among power combiners of other stages except the first stage, each power combiner is connected with multiple power combiners of an upper stage;
among the power combiners of other stages except last stage, each coupler is merely connected with one power combiner of a lower stage; and
a power combiner of the last stage is connected with the power monitoring module.

5. The apparatus according to claim 4, wherein each of the power combiners of the first stage is connected with a same number of couplers; and
among the power combiners of other stages except the first stage, each of the power combiners of a same stage is connected with a same number of power combiners of an upper stage.

6. The apparatus according to claim 4, wherein connections between the couplers and the power combiners and connections between the power combiners of different stages are all realized by equal-length radio frequency cables.

7. The apparatus according to claim 4, further comprising an attenuator,
wherein the attenuator is disposed between the power combiner of the last stage and the power monitoring module, and the attenuator is configured to adjust the total power according to an input power range of the power monitoring module.

8. The apparatus according to claim 4, further comprising a switch component,
wherein the switch component is disposed between the power combiner of the last stage and the power monitoring module.

9. The apparatus according to claim 1, wherein the power monitoring module is further configured to:
detect whether the total power is within a preset normal power range, wherein the normal power range is set according to a rated power of the transmitter/receiver modules; and
generate and emit an alarm signal, if it is detected that the total power is not within the preset normal power range.

10. The apparatus according to claim 1, wherein the power monitoring module is further configured to:
receive a first electromagnetic wave signal transmitted by each transmitter/receiver module, to obtain an amplitude and a phase of the first electromagnetic wave signal, and
compare the amplitude and the phase of the first electromagnetic wave signal with an amplitude and a phase of an electromagnetic wave signal input to the transmitter/receiver module to acquire an amplitude difference and a phase difference between the first electromagnetic wave signal and the electromagnetic wave signal input to the transmitter/receiver module, so as to obtain a transmitting channel performance of the transmitter/receiver module based on the amplitude difference and the phase difference.

11. The apparatus according to claim 1, wherein the power monitoring module is further configured to:
generate a second electromagnetic wave signal with a stable amplitude and phase,
transmit the second electromagnetic wave signal to each transmitter/receiver module via the power combiners of multiple stages and the couplers, and
compare the amplitude and the phase of the obtained second electromagnetic wave signal with an amplitude and a phase of an electromagnetic wave signal received by the transmitter/receiver module to acquire an amplitude difference and a phase difference between the second electromagnetic wave signal and the electromagnetic wave signal received by the transmitter/receiver module, so as to obtain a receiving channel performance of the transmitter/receiver module based on the amplitude difference and the phase difference.

12. A radar system, comprising the radar transmitting power and channel performance monitoring apparatus according to claim 1, and further comprising transmitter/receiver modules.

13. The system according to claim 12, further comprising a radar control unit connected with the transmitter/receiver modules,
wherein the radar control unit is further connected with the power monitoring module of the radar transmitting power and channel performance monitoring apparatus.

14. The system according to claim 13, wherein the radar control unit is configured to:
control, at time of testing an amplitude/phase consistency of a transmitting channel of a target transmitter/receiver module, transmitter/receiver modules other than the target transmitter/receiver module to be in an off state, and
control the target transmitter/receiver module to be in a transmitting state, so that the radar transmitting power and channel performance monitoring apparatus obtains amplitude and phase values of transmitting signals of the target transmitter/receiver module.

15. The system according to claim 13, wherein the radar control unit is configured to:
control, at time of testing an amplitude/phase consistency of a receiving channel of a target transmitter/receiver module, transmitter/receiver modules other than the target transmitter/receiver module to be in an off state, and
control the target transmitter/receiver module to be in a receiving state, so that signals generated by the radar transmitting power and channel performance monitoring apparatus are received by the target transmitter/receiver module.

16. The apparatus according to claim 4, wherein the power monitoring module is further configured to:
   detect whether the total power is within a preset normal power range, wherein the normal power range is set according to a rated power of the transmitter/receiver modules; and
   generate and emit an alarm signal, if it is detected that the total power is not within the preset normal power range.

17. The apparatus according to claim 16, wherein the power monitoring module is further configured to:
   receive a first electromagnetic wave signal transmitted by each transmitter/receiver module, to obtain an amplitude and a phase of the first electromagnetic wave signal, and
   compare the amplitude and the phase of the first electromagnetic wave signal with an amplitude and a phase of an electromagnetic wave signal input to the transmitter/receiver module to acquire an amplitude difference and a phase difference between the first electromagnetic wave signal and the electromagnetic wave signal input to the transmitter/receiver module, so as to obtain a transmitting channel performance of the transmitter/receiver module based on the amplitude difference and the phase difference.

18. The apparatus according to claim 17, wherein the power monitoring module is further configured to:
   generate a second electromagnetic wave signal with a stable amplitude and phase,
   transmit the second electromagnetic wave signal to each transmitter/receiver module via the power combiners of multiple stages and the couplers, and
   compare the amplitude and the phase of the obtained second electromagnetic wave signal with an amplitude and a phase of an electromagnetic wave signal received by the transmitter/receiver module to acquire an amplitude difference and a phase difference between the second electromagnetic wave signal and the electromagnetic wave signal received by the transmitter/receiver module, so as to obtain a receiving channel performance of the transmitter/receiver module based on the amplitude difference and the phase difference.

19. The apparatus according to claim 18, further comprising an attenuator,
   wherein the attenuator is disposed between the power combiner of the last stage and the power monitoring module, and the attenuator is configured to adjust the total power according to an input power range of the power monitoring module.

20. The apparatus according to claim 19, wherein each of the couplers is disposed at an antenna end of a respective transmitter/receiver module, and is configured to collect transmitting power of the respective transmitter/receiver module according to a preset coupling ratio.

* * * * *